(12) United States Patent
Hirai

(10) Patent No.: US 9,209,524 B2
(45) Date of Patent: Dec. 8, 2015

(54) WIRELESS TERMINAL INSTALLATION DEVICE

(75) Inventor: Tomoaki Hirai, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 416 days.

(21) Appl. No.: 13/696,964

(22) PCT Filed: May 19, 2011

(86) PCT No.: PCT/JP2011/061571
§ 371 (c)(1),
(2), (4) Date: Nov. 8, 2012

(87) PCT Pub. No.: WO2011/145695
PCT Pub. Date: Nov. 24, 2011

(65) Prior Publication Data
US 2013/0059528 A1 Mar. 7, 2013

(30) Foreign Application Priority Data

May 21, 2010 (JP) ................................. 2010-117733

(51) Int. Cl.
*H04M 1/00* (2006.01)
*H04B 1/38* (2015.01)
*H01Q 19/22* (2006.01)
*H01Q 1/38* (2006.01)
*H04M 1/04* (2006.01)

(52) U.S. Cl.
CPC ................ *H01Q 19/22* (2013.01); *H01Q 1/38* (2013.01); *H04M 1/04* (2013.01)

(58) Field of Classification Search
CPC combination set(s) only.
See application file for complete search history.

(56) References Cited

U.S. PATENT DOCUMENTS

| 6,134,421 | A | * | 10/2000 | Lee et al. | ................... 455/575.9 |
| 8,092,060 | B2 | | 1/2012 | Osada | |
| 2003/0232633 | A1 | * | 12/2003 | Iida et al. | ................... 455/575.7 |
| 2009/0322285 | A1 | * | 12/2009 | Hautanen | ...................... 320/137 |

FOREIGN PATENT DOCUMENTS

| JP | 2005-277632 A | 10/2005 |
| JP | 2007-318595 A | 12/2007 |
| JP | 2008-97332 A | 4/2008 |
| JP | 2008-147906 A | 6/2008 |
| JP | 2008-206094 A | 9/2008 |
| WO | WO 99/13527 A1 | 3/1999 |

OTHER PUBLICATIONS

International Search Report, including English translation dated Aug. 9, 2011 (four (4) pages).
Japanese Office Action with English Translation dated Feb. 4, 2014 (six (6) pages).

* cited by examiner

*Primary Examiner* — Tilahun B Gesesse
(74) *Attorney, Agent, or Firm* — Crowell & Moring LLP

(57) ABSTRACT

A wireless terminal installation device on which a wireless terminal is to be installed includes a housing and a substrate provided at an inside of the housing. The substrate includes at least a printed board, a mounting part that is provided on the printed board and mounted with a conductor, a conductor-free part which is an area that excludes a conductor, and a parasitic antenna that is provided on the conductor-free part to re-emit a radio wave received.

11 Claims, 5 Drawing Sheets

(A)

(B)

(A)

(B)

WIRELESS TERMINAL INSTALLATION DEVICE

TECHNICAL FIELD

The present invention relates to a device (an accessory for a wireless terminal) on which a wireless terminal is to be installed.

BACKGROUND ART

Conventionally, as a device for installing a wireless terminal such as a mobile phone, an instrument (cradle) disclosed in Patent Literature 1 is known, for example.

The wireless terminal installation device disclosed in Patent Literature 1 is configured so that the mobile phone is placed horizontally on a rectangular parallelepiped shaped installation part with a built-in substrate.

CITATION LIST

Patent Literature

Patent Literature 1: JP-A-2005-277632

SUMMARY OF INVENTION

Technical Problem

In the device disclosed in Patent Literature 1, an antenna of the wireless terminal is spaced apart from the installation part and therefore there is little effect on a transmitting/receiving performance of the wireless terminal. However, if the antenna of the wireless terminal is provided at a position near the installation part, for example, there is a risk that the transmitting/receiving performance of the wireless terminal is degraded due to a wiring of the substrate or a housing metal in the installation part.

Accordingly, an object of the present invention is to provide a wireless terminal installation device capable of reducing effects on communication of the wireless terminal.

Solution to Problem

In an aspect of the present invention, a wireless terminal installation device on which a wireless terminal is to be installed includes a housing and a substrate provided at an inside of the housing. The substrate includes at least a printed board, a mounting part provided on the printed board and mounted with a conductor, a conductor-free part which is an area that excludes a conductor and a parasitic antenna provided on the conductor-free part to re-emit a radio wave received.

As such, in the wireless terminal installation device, first, the conductor-free part which is an area that excludes the conductor is provided. However, in a case where the area that excludes the conductor is provided alone, there is a need to increase an opening area of the conductor-free part to some extent in order to allow a sufficient radio wave to pass therethrough and thus the whole installation device becomes larger. For this reason, the parasitic antenna for re-emitting the received radio wave is provided on the conductor-free part. By doing so, it is possible to reduce the degradation of the transmitting/receiving performance of the wireless terminal, even when an installation part is provided near the antenna of the wireless terminal and the opening area is small and thus a size of the whole installation device becomes compact.

Further, the conductor includes a conductor having a stable potential for the radio wave of the wireless terminal and the parasitic antenna is unconnected in a high-frequency electrical circuit to the conductor (for example, a circuit ground of the installation device, etc.) having the stable potential for the radio wave of the wireless terminal. That is, the parasitic antenna does not supply the radio wave to the wireless terminal via an electrical circuit but spatially transmits the radio wave (serves as a function of a wave director).

Further, if the parasitic antenna is formed of a wiring pattern (for example, a loop-shaped wiring pattern) provided on the printed board, a process for providing the parasitic antenna is not added and thus a cost-up does not occur.

Further, the parasitic antenna is provided for guiding the radio wave from a particular direction, such as in a communication orientation of the antenna of the wireless terminal, that is, an orientation of an antenna of a base station as seen from the antenna of the wireless terminal. For example, the parasitic antenna is effective for a case where the wireless terminal is required to communicate with the base station in a particular orientation (for example, back face 90° to 130°, etc.).

Further, a connector for connecting to the wireless terminal is mounted adjacent to the conductor-free part on the mounting part. Thereby, when the antenna of the wireless terminal is placed near the connector, the positions of the antenna of the wireless terminal and the conductor-free part can be located adjacent to each other and thus it is possible to reduce the degradation of the transmitting/receiving performance of the wireless terminal.

Advantageous Effects of Invention

According to the aspects of the present invention, it is possible to reduce effects of the wiring board or the housing metal of the installation part on the communication of the wireless terminal.

MODES FOR CARRYING OUT INVENTION

Figure 1:
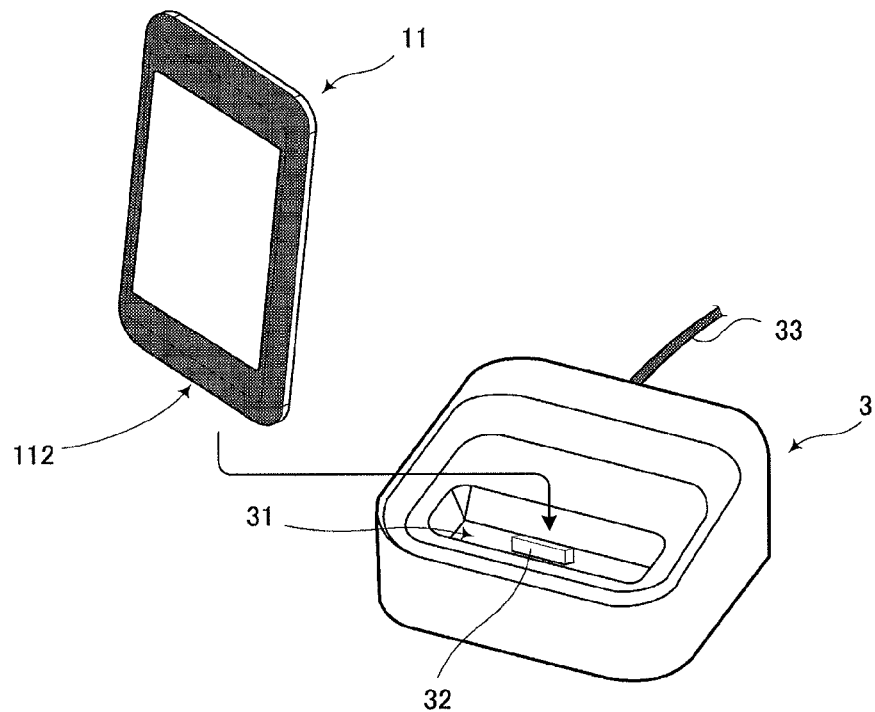
In FIG. 1, (A) is an external perspective view showing a cradle according to an embodiment of a wireless terminal installation device of the invention and a wireless terminal, and in FIG. 1, (B) is a partially transparent side view showing the wireless terminal installation device.
Figure 1:
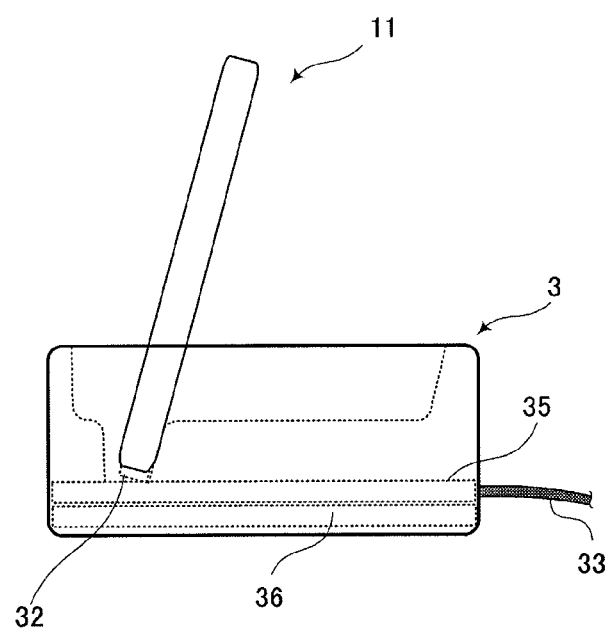

In FIG. 1, (A) is an external perspective view showing a cradle according to an embodiment of a wireless terminal installation device of the present invention and a wireless terminal. In FIG. 1, (B) is a partially transparent side view showing the wireless terminal installation device.

A cradle (housing) 3 is a device on which the wireless terminal such as a mobile phone is placed. The cradle 3 mediates a wired-communication between the wireless terminal and another instrument or supplies a power. The cradle 3 includes a rectangular parallelepiped shaped housing and an upper surface of the housing recessed in multi-steps in a bucket shape. In the housing of this example, the upper surface is recessed in two-steps and a surface of a lowermost step thereof is formed as an installation surface 31.

The installation surface 31 is provided at its center with a connector 32 to which a connector 112 of a wireless terminal 11 is connected. The connector 32 and a cable 33 are mounted on the substrate 35 which is, in turn, fixed to the housing bottom 36.

A bottom surface of the installation surface 31 has an area slightly larger than that of a bottom surface of the wireless terminal 11. Further, a width of the installation surface 31 is substantially the same as a width of the bottom surface of the wireless terminal 11 and the wireless terminal 11 can be fitted and thus mounted at peripheral side surfaces of the housing and the installation surface 31. Further, a portion of the peripheral side surfaces of the housing in the installation surface 31 is obliquely inclined, so that the wireless terminal 11 can be fixed to the housing by making the wireless terminal 11 being leaned against the obliquely inclined side surface.

The connector 112 of the wireless terminal 11 is connected to the connector 32 provided on the installation surface 31, so that the wireless terminal 11 makes a wired-communication with another instrument via the substrate 35 and the cable 33 or is supplied with a power from another instrument to charge a built-in battery (not shown).

In this embodiment, the wireless terminal 11 serves as a function of both a mobile phone and a digital audio player and the cradle 3 serves as a function of mediating the transmission and reception of various data (musical data, etc.) between another instrument such as an AV amplifier and the wireless terminal 11. The cradle 3 is such that hardware for implementing the mediating function is mounted on the substrate 35.

Figure 2:
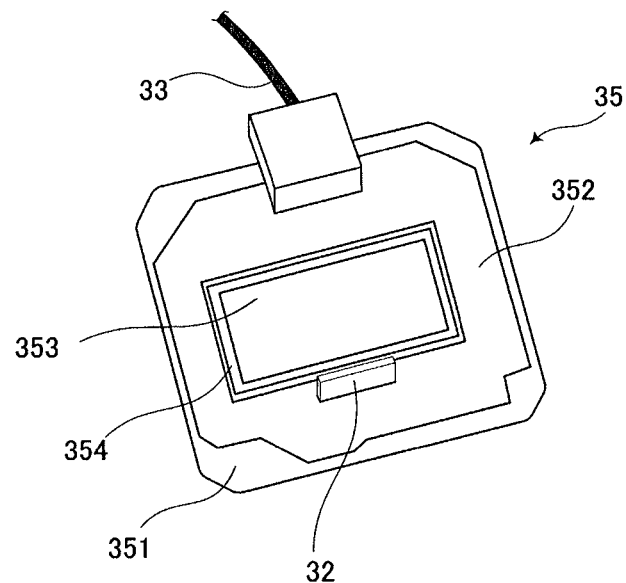
In FIG. 2, (A) is an external perspective view showing a substrate 35, and in FIG. 2, (B) is an external perspective view showing a housing bottom 36.
Figure 2:
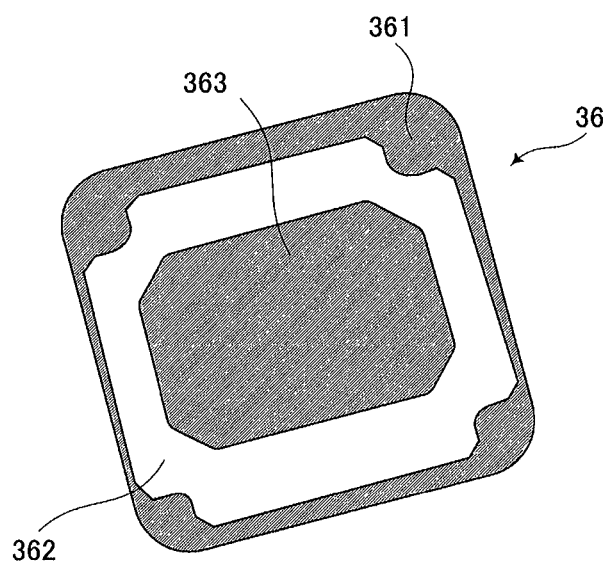

In FIG. 2, (A) is an external perspective view showing the substrate 35. In FIG. 2, (B) is an external perspective view showing the housing bottom 36. The housing bottom 36 includes a rectangular resin plate 361 and an iron plate 362 fixed to an upper surface of the resin plate 361. The iron plate 362 serves as a function of a weight and is intended for fixing the cradle 3 on a plane such as a desk when the wireless terminal 11 is installed.

The substrate 35 is fixed to the upper surface of the housing bottom 36 using a retainer such as a screw. The substrate 35 includes a printed board 351 made of glass epoxy, etc., and a mounting part 352 provided on the printed board 351. The connector 32, the cable 33 and other wiring or capacitor, or the like are mounted on the mounting part 352.

Here, a central portion of the printed board 351 is configured as a conductor-free part 353 that excludes a conductor such as a wiring. Further, the iron plate 362 of the housing bottom 36 is also provided at its central portion with an opening 363 which is formed as a conductor-free part. Although it has been illustrated that an area of the opening 363 is larger than that of the conductor-free part 353 in the present embodiment, these areas may be substantially the same. Further, although it has been illustrated that both the conductor-free part 353 and the opening 363 have a rectangular shape, these may have other shapes such as a square shape, of course.

As such, the wireless terminal installation device of the present embodiment is configured so that the conductor-free part which is an area that excludes a conductor is provided at a portion of the housing bottom and the substrate and thus effects on the radio wave of the wireless communication of the wireless terminal 11 can be reduced. However, in a case where the area that excludes a conductor is provided alone, there is a need to increase an opening area of the conductor-free part to some extent in order to allow a sufficient radio wave to pass therethrough and thus whole installation device becomes larger. For this reason, in an aspect of the cradle 3 of the present embodiment, a parasitic antenna 354 is provided at the inside of the conductor-free part 353.

The parasitic antenna 354 is a wiring pattern formed on the printed board 351 and formed as a loop-shaped rectangular pattern, in an example of FIG. 2 (A). When the parasitic antenna 354 is configured by the wiring pattern formed on the printed board 351, a process for providing the parasitic antenna 354 is not added and thus a cost-up does not occur. However, the conductor-free part 353 and the parasitic antenna 354 are not necessarily formed on the same plane and the parasitic antenna may be provided at the inside of the conductor-free part, as seen from the antenna of the wireless terminal. Further, whole parasitic antenna 354 is not necessarily provided at the inside of the conductor-free part and a portion of the parasitic antenna may be arranged at the outside of the conductor-free part. Further, although the parasitic antenna 354 is surrounded with the mounting part 352, it is not essential that the parasitic antenna 354 is surrounded with the mounting part 352, of course.

The parasitic antenna 354 is not connected in a high-frequency electrical circuit to the antenna of the wireless terminal 11 and the conductor (ground of the mounting part 352, etc.) having a stable potential for the radio wave of the wireless terminal 11. The parasitic antenna 354 does not supply the radio wave to the antenna of the wireless terminal 11 via an electrical circuit but spatially transmits the radio wave. That is, the parasitic antenna 354 receives a radio wave from the base station, etc., and re-emits the received radio wave. The parasitic antenna 354 controls the directivity of the radio wave and serves as a function of a wave director for supplying the radio wave to the antenna of the wireless terminal 11. Accordingly, the shape of the parasitic antenna 354 is not limited to the loop-shaped rectangular pattern but the parasitic antenna may have any shape as long as the parasitic antenna serves as a function of the wave director for re-emitting the received radio wave (other examples of the shape will be described later).

Further, the parasitic antenna 354 is provided for guiding the radio wave from a particular direction, such as in a communication orientation of the antenna of the wireless terminal 11, that is, an orientation of the antenna of the base station as seen from the antenna of the wireless terminal 11. In this manner, the parasitic antenna for guiding the radio wave from the particular orientation is effective for a situation as follows.

Figure 3:
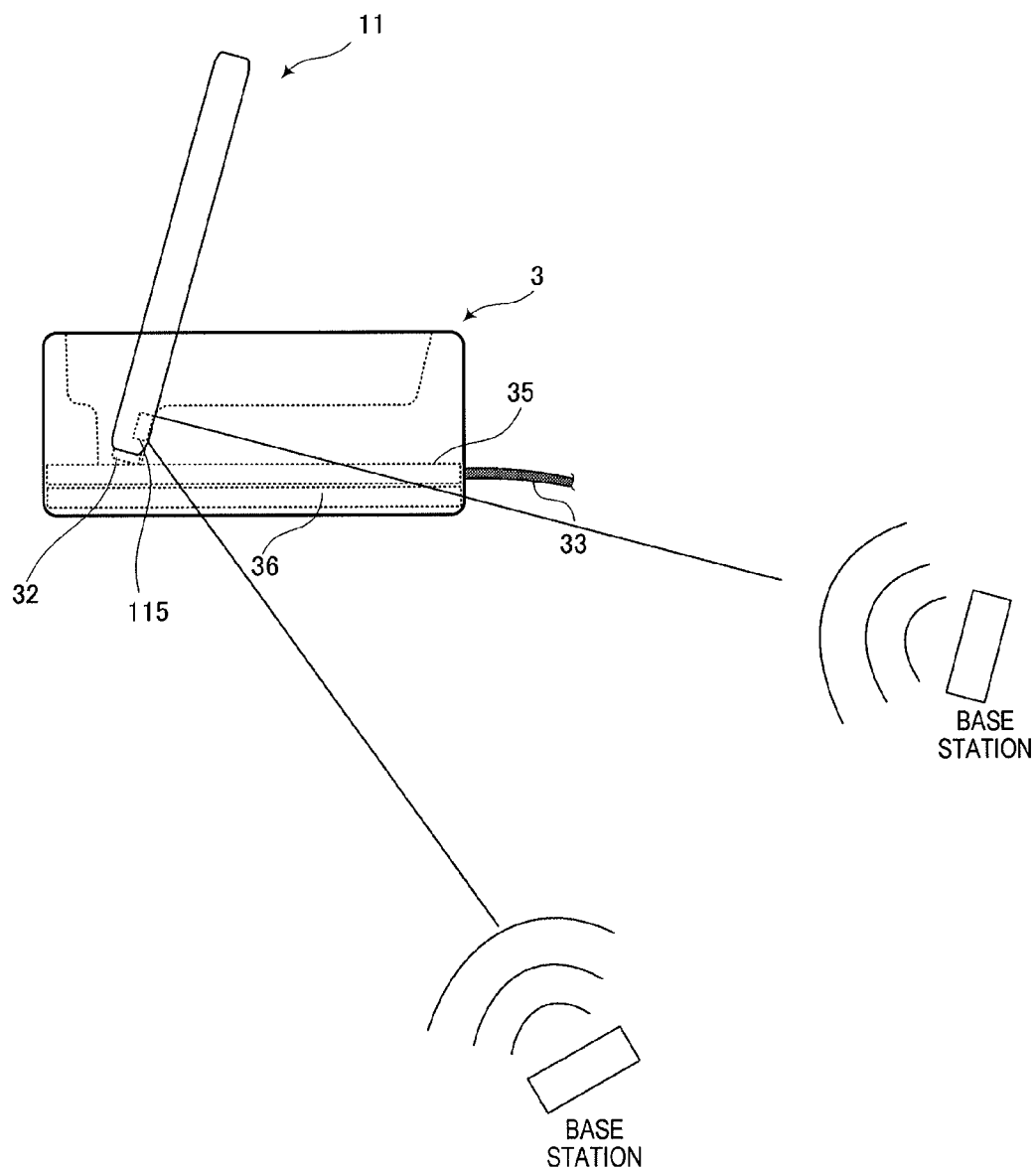
FIG. 3 is a diagram for explaining a radio wave when the wireless terminal is being installed.

That is, as shown in FIG. 3, the parasitic antenna is effective for a case where the antenna 115 of the wireless terminal 11 is installed near a bottom surface thereof and the antenna 115 is required to communicate with the base station (for example, a case where it is verified whether an instrument such as the cradle 3 can be authenticated as a corresponding accessory or not) in a particular orientation (in an example of FIG. 3, back face 90° to 130° of the wireless terminal 11). In this case, it is preferable that the conductor-free part 353 is formed near the connector 32 to allow the antenna 115 of the wireless terminal 11 and the conductor-free part 353 to be located adjacent to each other.

The conductor-free part 353, the opening 363 and the parasitic antenna 354 are provided for reducing effects on the radio wave having an orientation of back face 90° to 130° as seen from the wireless terminal 11, that is, for guiding the radio wave from the orientation. Since the parasitic antenna 354 guides the radio wave having the orientation of back face 90° to 130°, the antenna 115 receives the radio wave from the base station, which has a gain of more than a predetermined level. Accordingly, the cradle 3 is authenticated as a suitable accessory of the wireless terminal 11 and thus can mediate a wired-communication.

As mentioned above, since the wireless terminal installation device of the present embodiment is such that the parasitic antenna for re-emitting the received radio wave is provided at the inside of the conductor-free part, as seen from the antenna of the wireless terminal, it is possible to reduce effects on the communication of the wireless terminal, even in an aspect where the immediately proximity of the antenna of the wireless terminal is blocked by the housing. In particular, it is possible to reduce the degradation of the transmitting/receiving performance of the wireless terminal, even if the opening area of the conductor-free part on the substrate or a metal part of the housing is small and thus a size of whole installation device becomes compact.

Figure 4:
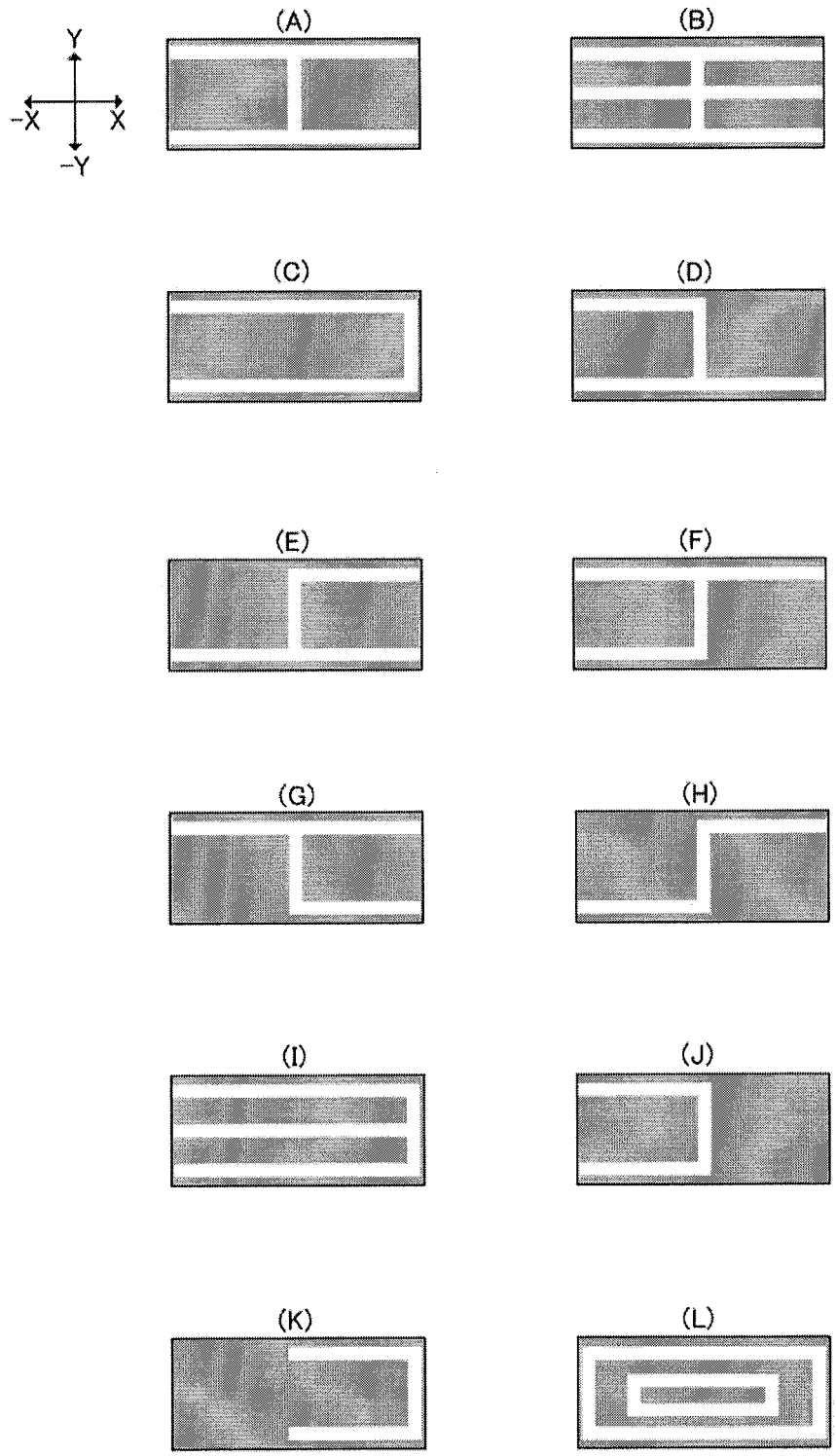
FIG. 4 shows other examples of the parasitic antenna.

Next, FIG. 4 shows other examples of the parasitic antenna. Inventor of the wireless terminal installation device illustrated in the present embodiment measured the communication performance (gain of the radio wave) of the wireless terminal 11 for various shapes of the parasitic antenna and then obtained multiple shapes in which the communication performance of the wireless terminal 11 has been improved by comparing cases where the parasitic antenna is not provided (the conductor-free part is provided alone) with cases where the parasitic antenna is provided. At this time, the measurement was carried out in a state where a usable frequency of the wireless terminal is set as approximately 880 MHz. Twelve types of typical shapes are illustrated in FIG. 4. For the sake of convenience of explanation, in the plane of paper, an upper direction is defined as Y direction, a lower direction is defined as −Y direction, a right direction is defined as X direction and a left direction is defined as −X direction.

For example, FIG. 4 (A) shows an example where wiring patterns extending from an end of −X direction to an end of X direction at ends of Y direction and −Y direction and a wiring pattern extending from an end of −Y direction to an end of Y direction near the central position (origin) of X direction and −X direction are formed and thus a "⊥" shaped parasitic antenna is formed. FIG. 4 (B) shows an example where a wiring pattern extending from the end of −X direction to the end of X direction near an origin of Y direction and −Y direction is formed, in addition to the wiring patterns shown in FIG. 4 (A) and thus a "王" shaped parasitic antenna is formed.

FIG. 4 (C) shows an example where wiring patterns extending from the end of −X direction to the end of X direction at the ends of Y direction and −Y direction and a wiring pattern extending from the end of −Y direction to the end of Y direction at the end of X direction are formed and thus a "⊐" shaped parasitic antenna is formed. FIG. 4 (D) shows an example where a wiring pattern extending from the end of −X direction to the end of X direction at the end of −Y direction, a wiring pattern extending from the end of −Y direction to the end of Y direction near the origin of X direction and −X direction and a wiring pattern extending from the end of −X direction to near the origin of X direction at the end of Y direction are formed and thus a "⊐" shaped parasitic antenna is formed. FIG. 4 (E) shows a parasitic antenna of laterally inverted patterns of FIG. 4 (D). FIG. 4 (F) shows a parasitic antenna of vertically inverted patterns of FIG. 4 (D). FIG. 4 (G) shows a parasitic antenna of vertically inverted patterns of FIG. 4 (E).

Further, FIG. 4 (H) shows an parasitic antenna in which a wiring pattern extends from the end of −X direction to near the origin of X direction at the end of −Y direction, a wiring pattern extends from the end of −Y direction to the end of Y direction near the origin of X direction and −X direction and a wiring pattern extends from near the origin of X direction to the end of X direction at the end of Y direction.

FIG. 4 (I) shows an example where wiring patterns extending from the end of −X direction to the end of X direction at the ends of Y direction and −Y direction and near the origin of Y direction and a wiring pattern extending from the end of −Y direction to the end of Y direction at the end of X direction are formed and thus a "∃" shaped parasitic antenna is formed.

FIG. 4 (J) also shows a "⊐" shaped parasitic antenna. But, the parasitic antenna shown in FIG. 4 (J) includes wiring patterns which extend from the end of −X direction to near the origin of X direction at the ends of Y direction and −Y direction and a wiring pattern which extends from the end of −Y direction to the end of Y direction near the origin of X direction and −X direction.

FIG. 4 (K) also shows a "⊐" shaped parasitic antenna. The parasitic antenna shown in FIG. 4 (K) includes wiring patterns which extend from near the origin of X direction to the end of X direction at the ends of Y direction and −Y direction and a wiring pattern which extends from the end of −Y direction to the end of Y direction at the end of X direction.

FIG. 4 (L) shows a parasitic antenna which further includes a loop-shaped rectangular pattern at the inside of the loop-shaped rectangular pattern shown in FIG. 2.

The inventor has found that the communication performance (gain of the radio wave) of the wireless terminal 11 is improved in all of the above patterns. However, it is noted that the above examples are adapted to verify a gain at a particular frequency (880 MHz) and the shape of the parasitic antenna for improving the communication performance is, of course, varied when the frequency is changed (for example, the frequency becomes 2.1 GHz). However, it has been found that the parasitic antenna having the shape shown in FIG. 4 (C), FIG. 4 (I) and FIG. 4 (L) improve the communication performance at both 880 MHz and 2.1 GHz.

As such, the shape of the parasitic antenna 354 is not limited to the loop-shaped rectangular pattern but the parasitic antenna may have any shapes as long as the parasitic antenna serves as a function of the wave director for re-emitting the received radio wave. That is, the parasitic antenna may take various shapes according to a radio wave frequency used in the antenna of the wireless terminal, a shape or arrangement of the antenna of the wireless terminal, or the mounting pattern on the substrate or the shape of the housing metal in the wireless terminal installation device.

Figure 5:
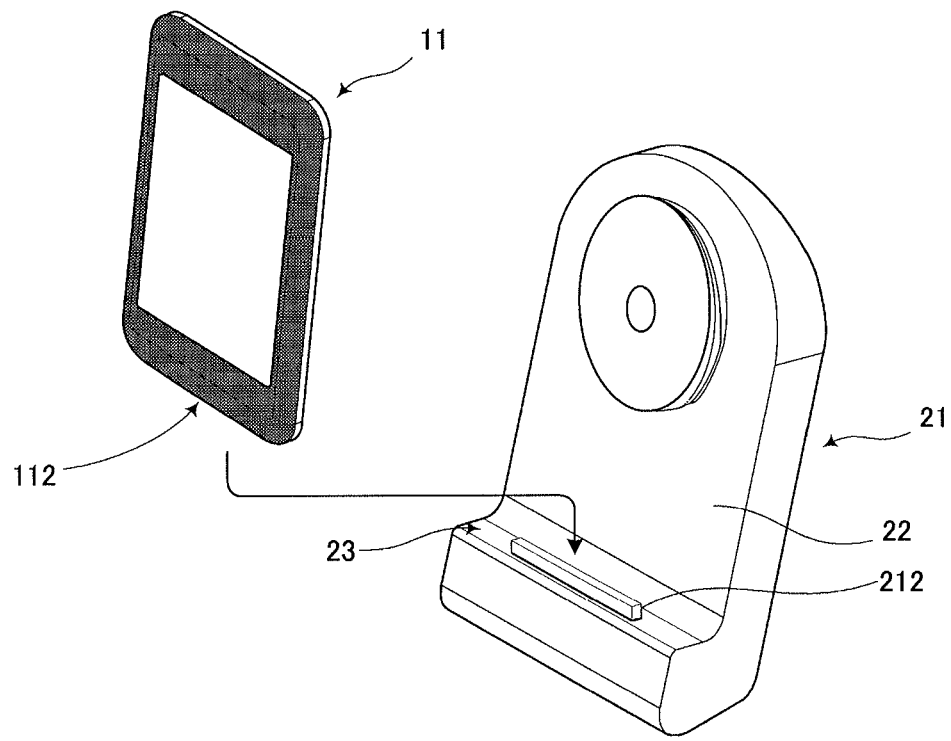
FIG. 5 shows another example of the wireless terminal installation device.

The wireless terminal installation device is not limited to the rectangular parallelepiped shaped housing. Further, the connection with another instrument such as the AV amplifier is not limited to a wired-connection. For example, an aspect employing a wireless adapter shown in FIG. 5 is also possible. The wireless adapter 21 shown in FIG. 5 has a built-in wireless communication part and wirelessly transmits a musical data received from the wireless terminal 11 to another instrument such as the AV amplifier to mediate the communication between the wireless terminal and another instrument. However, the wireless communication system of the wireless adapter 21 is different from the communication system between the wireless terminal 11 and the base station. For example, the wireless communication system is a specific standard for performing an uncompressed data transmission of the musical data.

The wireless adapter 21 is made of a substantially rectangular parallelepiped shaped housing which is long and thin in a height direction and has an L shape in which a portion of a lower side of the housing protrudes toward the front. A connector 212 is provided at an upper surface of the portion (support portion) 23 protruding toward the front. The wireless terminal 11 is adapted to be held by the upper surface of the support portion 23 and the front surface 22 of the housing.

Herein, the wireless adapter 21 is such that the conductor-free part and the parasitic antenna for re-emitting the radio wave received from the base station are provided to reduce effects on the communication radio wave of the wireless terminal 11, similarly to the cradle 3 shown in FIGS. 1 and 2.

For example, a portion of a substrate (not shown) which is arranged at the inside of the support portion 23 is formed as the conductor-free part and the parasitic antenna is provided. Further, a portion of a substrate (not shown) which is arranged at the inside of the front surface 22 may be formed as the conductor-free part and the parasitic antenna may be provided.

The invention claimed is:

1. A wireless terminal installation device on which a wireless terminal is to be installed, the device comprising:
   a housing; and
   a substrate that is provided at an inside of the housing,
   wherein the substrate includes at least:
      a printed board;
      a mounting part that is provided on the printed board and mounted with a conductor;
      a conductor-free part which is an area that excludes a conductor; and
      a parasitic antenna that is provided on the conductor-free part to re-emit a radio wave received.

2. The wireless terminal installation device according to claim 1, wherein
   the conductor includes a conductor having a stable potential for the radio wave of the wireless terminal, and
   the parasitic antenna is unconnected in a high-frequency electrical circuit to the conductor having the stable potential for the radio wave of the wireless terminal.

3. The wireless terminal installation device according to claim 2, wherein
   the parasitic antenna is formed of a wiring pattern provided on the printed board.

4. The wireless terminal installation device according to claim 2, wherein
   the parasitic antenna is provided in a communication orientation of the antenna of the wireless terminal.

5. The wireless terminal installation device according to claim 2, wherein
   a connector for connecting to the wireless terminal is mounted adjacent to the conductor-free part on the mounting part.

6. The wireless terminal installation device according to claim 1, wherein
   the parasitic antenna is formed of a wiring pattern provided on the printed board.

7. The wireless terminal installation device according to claim 6, wherein
   the parasitic antenna is provided in a communication orientation of the antenna of the wireless terminal.

8. The wireless terminal installation device according to claim 6, wherein
   a connector for connecting to the wireless terminal is mounted adjacent to the conductor-free part on the mounting part.

9. The wireless terminal installation device according to claim 1, wherein
   the parasitic antenna is provided in a communication orientation of the antenna of the wireless terminal.

10. The wireless terminal installation device according to claim 9, wherein
    a connector for connecting to the wireless terminal is mounted adjacent to the conductor-free part on the mounting part.

11. The wireless terminal installation device according to claim 1, wherein
    a connector for connecting to the wireless terminal is mounted adjacent to the conductor-free part on the mounting part.

* * * * *